(12) United States Patent
Wong

(10) Patent No.: US 6,838,983 B1
(45) Date of Patent: Jan. 4, 2005

(54) PRECISION INFLATION DEVICE

(76) Inventor: Alex Yung Kan Wong, Suite 323 - 5525 West Boulevard, Vancouver, BC (CA), V6M 2W6

( * ) Notice: Subject to any disclaimer, the term of this patent is extended or adjusted under 35 U.S.C. 154(b) by 0 days.

(21) Appl. No.: 10/648,226

(22) Filed: Aug. 27, 2003

(51) Int. Cl.$^7$ ............................................. B60C 23/00
(52) U.S. Cl. ....................... 340/442; 152/415; 73/146.2
(58) Field of Search ................................ 152/415, 418; 340/442, 443, 449; 73/146.2, 146.5

(56) References Cited

U.S. PATENT DOCUMENTS

| | | | | |
|---|---|---|---|---|
| 3,494,184 A | * | 2/1970 | Raffaelli | 73/146.3 |
| 6,711,955 B1 | * | 3/2004 | Wilkerson, Jr. | 73/708 |
| 2002/0105420 A1 | * | 8/2002 | Yamagiwa et al. | 340/442 |
| 2003/0227380 A1 | * | 12/2003 | Piech et al. | 340/443 |

* cited by examiner

Primary Examiner—Frantz F. Jules
(74) Attorney, Agent, or Firm—Oyen Wiggs Green & Mutala

(57) ABSTRACT

The invention provides a device for measuring the pressure of a tire. The device comprises a microcontroller configured to calculate a target pressure, a pressure sensor coupled to the microcontroller for measuring an internal pressure of the tire, a first temperature sensor coupled to the microcontroller for measuring an internal temperature of the tire, a user input coupled to the microcontroller for inputting a recommended pressure for the tire, a second temperature sensor coupled to the microcontroller for measuring an ambient temperature, and, a display coupled to the microcontroller for indicating the internal pressure of the tire and the target pressure. The microcontroller converts the recommended pressure into the target pressure based on a ratio of the internal temperature in Kelvin to the ambient temperature in Kelvin, such that a user is able to inflate and deflate the tire until the display indicates that the internal pressure is equal to the target pressure.

8 Claims, 5 Drawing Sheets

PRECISION INFLATION DEVICE

TECHNICAL FIELD

The invention relates to inflating a tire, and more particularly to a device which allows a user to inflate a tire to the appropriate pressure even when the tire is not at ambient temperature.

BACKGROUND

Vehicle manufacturers typically provide a recommended pressure to which the vehicle's tires should be inflated for optimum performance and safety. The recommended pressure is generally determined on the assumption that the temperature of the air in the tires is the same as the temperature of the outside air (the "ambient temperature"). However, driving on a tire causes the air in the tire to heat up. Since many drivers drive to a service station to inflate their tires, unless they wait for their tires to cool down, it is likely that the tires will be improperly inflated.

U.S. Pat. No. 3,494,184 to Raffaelli discloses a pressure gauge which uses thermistors arranged in a bridge circuit to give an output proportional to the difference between the temperature of the air in the tire and the ambient temperature. The output is coupled to a motor which moves a graduated scale relative to a tube of mercury.

There exists a need for an improved device and method for facilitating the inflation of a tire to precisely the recommended pressure.

SUMMARY OF INVENTION

The invention provides a device for measuring the pressure of a tire. The device comprises a microcontroller configured to calculate a target pressure, a pressure sensor coupled to the microcontroller for measuring an internal pressure of the tire, a first temperature sensor coupled to the microcontroller for measuring an internal temperature of the tire, a user input coupled to the microcontroller for inputting a recommended pressure for the tire, a second temperature sensor coupled to the microcontroller for measuring an ambient temperature, and, a display coupled to the microcontroller for indicating the internal pressure of the tire and the target pressure. The microcontroller converts the recommended pressure into the target pressure based on a ratio of the internal temperature in Kelvin to the ambient temperature in Kelvin, such that a user is able to inflate and deflate the tire until the display indicates that the internal pressure is equal to the target pressure.

The device may further comprise a valve configured to be coupled to a stem of the tire. The valve may be connected to be controlled by the microcontroller for regulating the inflation and deflation of the tire based on the difference between the internal pressure and the target pressure.

The device may further comprise a locking lever configured to releasably secure the valve onto the stem of the tire.

The display may also indicate the recommended pressure input from the user input.

The invention also provides a method of inflating a tire comprising providing a device comprising a pressure sensor, first and second temperature sensors, a user input and a display, all coupled to a microprocessor, coupling the device to the tire, measuring a pressure P and a temperature T of air in the tire with the pressure sensor and the first temperature sensor, and measuring an ambient air temperature Ta with the second temperature sensor, inputting a recommended pressure Pr with the user input, calculating a target pressure $Pt=Pr+P(1-Ta/T)$, displaying the internal pressure P and the target pressure Pt on the display, and, adjusting an amount of air in the tire so that the internal pressure P is equal to the target pressure Pt.

The device may further comprise a valve coupled to the microcontroller, and coupling the device to the tire may comprise connecting a first end of the valve to a stem of the tire.

Adjusting the amount of air in the tire may comprise allowing air to flow from the first end of the valve to a second end of the valve when the internal pressure P is greater than the target pressure Pt.

The method may further comprise connecting the second end of the valve to a compressed air source, and adjusting the amount of air in the tire may comprise allowing air to flow from the second end of the valve to the first end of the valve when the internal pressure P is less than the target pressure Pt.

BRIEF DESCRIPTION OF DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
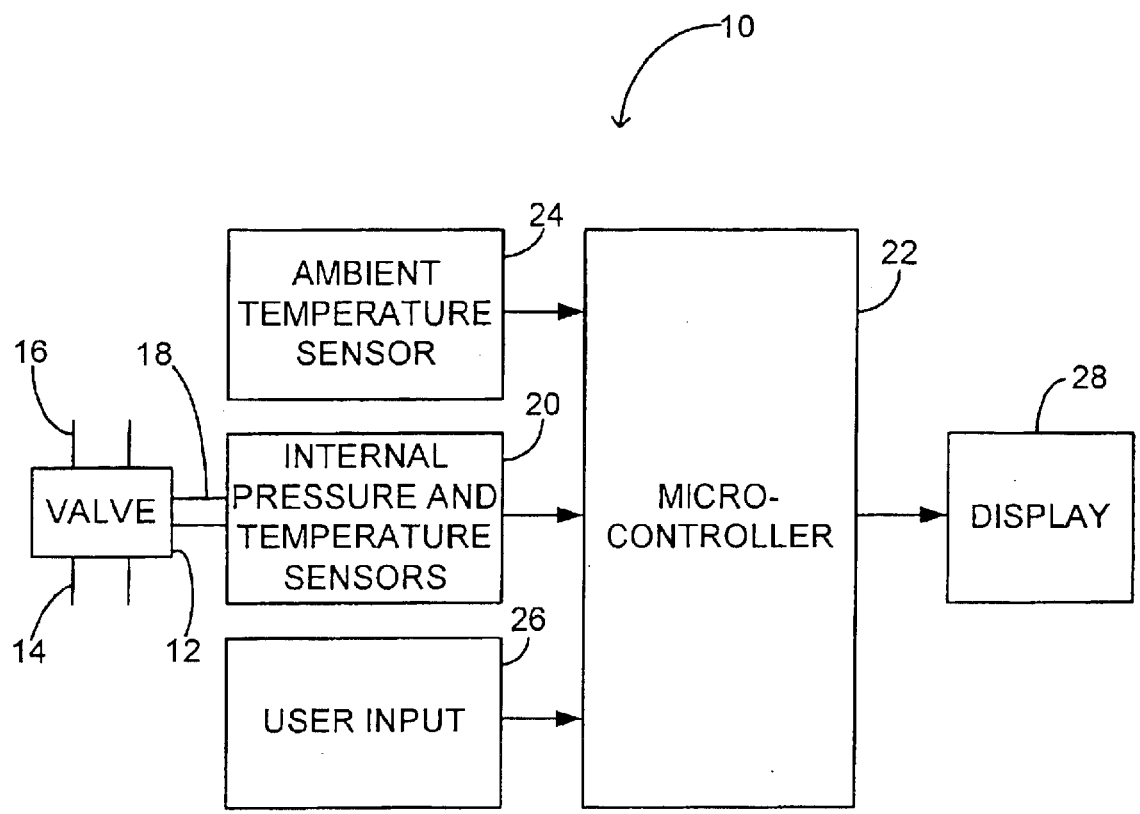
FIG. 1 is a block diagram illustrating the main functional units of a device according to one embodiment of the invention.

FIG. 1 is a block diagram illustrating the main functional units of a device 10 according to one embodiment of the invention. Device 10 comprises a valve 12 with a tire stem attachment mechanism 14 and pump attachment mechanism 16. Valve 12 passes air from a tire (not shown) through hose 18 to internal pressure and temperature sensors 20. Internal pressure and temperature sensors 20 are configured to measure the pressure P and temperature T of the air from the tire, and provide these values to microcontroller 22. Microcontroller 22 is also connected to receive an ambient temperature Ta from ambient temperature sensor 24, and a recommended pressure Pr from user input 26. The values of T and Ta are either passed to microcontroller 22 in Kelvin (absolute temperature) or are converted to Kelvin by microcontroller 22 before any calculations are performed.

Microcontroller 22 uses the values of P, T, Ta and Pr to calculate a target pressure Pt as follows:

1. Calculate an equivalent ambient pressure $Pa=P*Ta/T$, which is what the pressure of the air inside the tire would be if it were at ambient temperature.

2. Calculate a pressure difference dP=Pr−Pa, which is the difference between the recommended pressure and the equivalent ambient pressure.
3. Calculate the target pressure Pt=P+dP.

As one skilled in the art will understand, it is equally possible to calculate the target pressure Pt in a single step by combining the above equations: Pt=Pr+P(1−Ta/T).

Microcontroller 22 passes the target pressure Pt to display 28, so that the user can adjust the amount of air in the tire to make the measured pressure P equal to the target pressure Pt. Preferably, display 28 also receives the measured pressure P and the recommended pressure Pr from microcontroller 22 and displays these values to the user.

Figure 3:
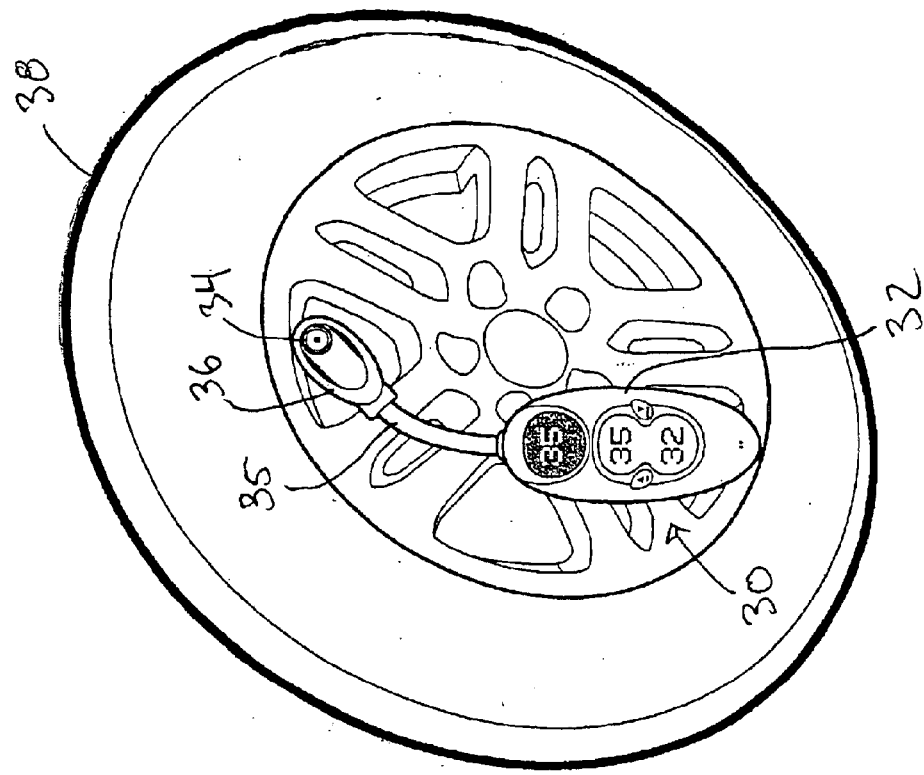
FIG. 3 is an isometric view of the device of FIG. 2 attached to a tire.
Figure 2:
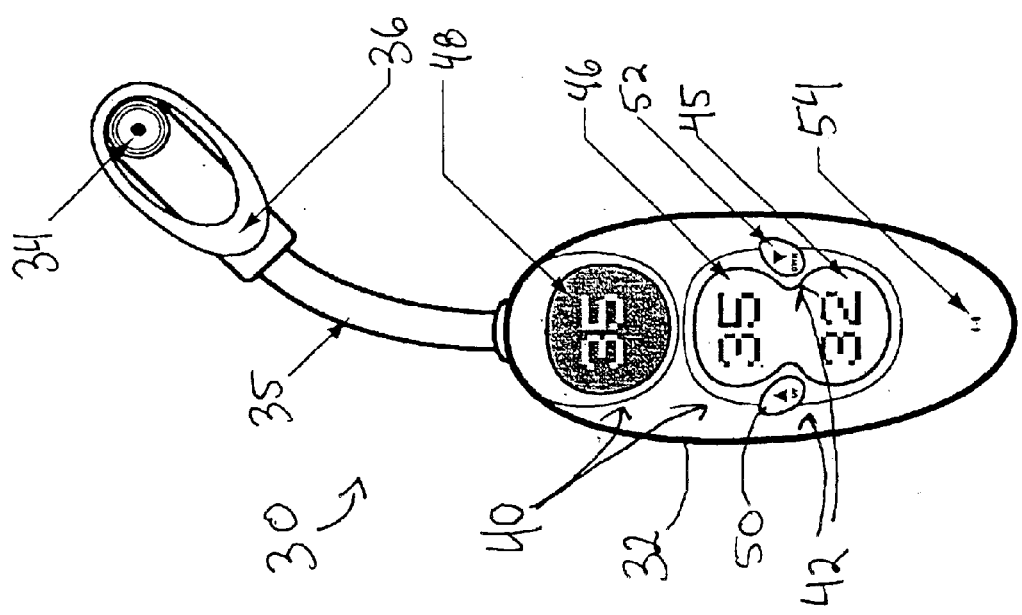
FIG. 2 is a front elevation view of a device according to another embodiment of the invention.
Figure 4:
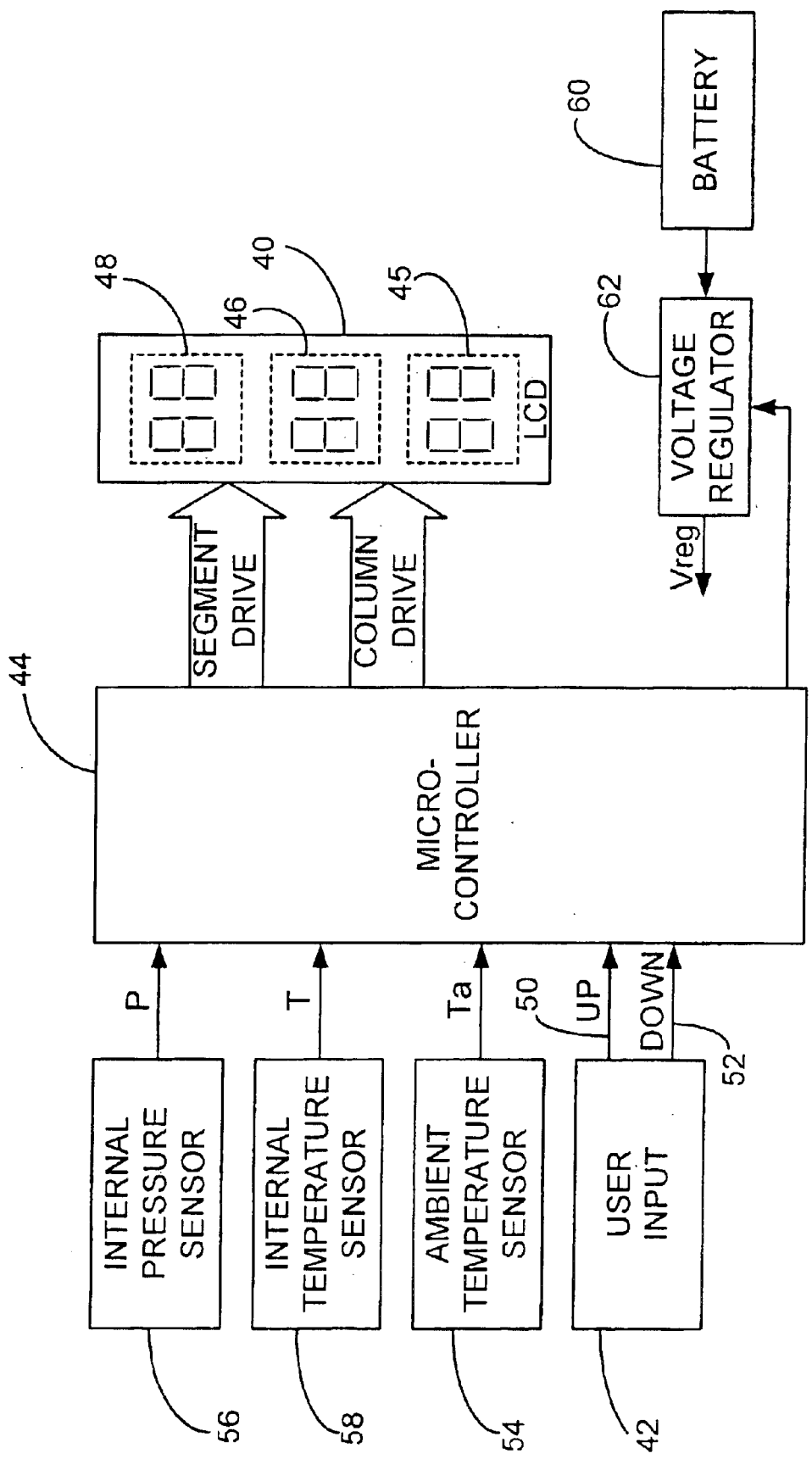
FIG. 4 is a schematic diagram of the components of the device of FIG. 2.

FIGS. 2 to 4 illustrate a device 30 according to a preferred embodiment of the invention. Device 30 comprises a body 32 with valve 34 coupled thereto by means of hose 35. A locking mechanism 36 may be provided to releasably secure valve 34 into operable engagement with the stem of a tire 38. Body 32 comprises display 40 and user input 42. Display 40 and user input 42 are connected to microcontroller 44 housed in body 32. In the illustrated embodiment, display 40 comprises a LCD with three display fields: a recommended pressure field 45, a target pressure field 46, and a measured pressure field 48, and user input 42 comprises up button 50 and down button 52. Device 30 also comprises an ambient temperature sensor 54 for measuring the ambient temperature Ta, and internal pressure and temperature sensors 56 and 58, respectively (not shown in FIGS. 2 and 3), all connected to microcontroller 44. Internal pressure and temperature sensors 56 and 58 are also operably coupled to valve 34 for measuring the pressure P and temperature T of the air inside tire 38. Microcontroller 44 is preferably powered by battery 60 coupled to voltage regulator 62.

A user inputs a recommended pressure Pr into device 30 with user input 42, which is displayed in recommended pressure field 45. When the device is attached to the stem of a tire 38, the pressure P of the air inside the tire is displayed in measured pressure field 48. Device 30 then calculates a target pressure Pt, as described above, and displays the target pressure Pt in target pressure field 46: The user can then adjust the amount of air in tire 38 so that the pressure P displayed in measured pressure field 48 equals the target pressure Pt displayed in target pressure field 46. Valve 34 may optionally be controlled by microcontroller 44 to prevent the user from inflating tire 38 when the pressure P exceeds the target pressure Pt, or from deflating tire 38 when the pressure P is lower than the target pressure Pt.

Figure 5:
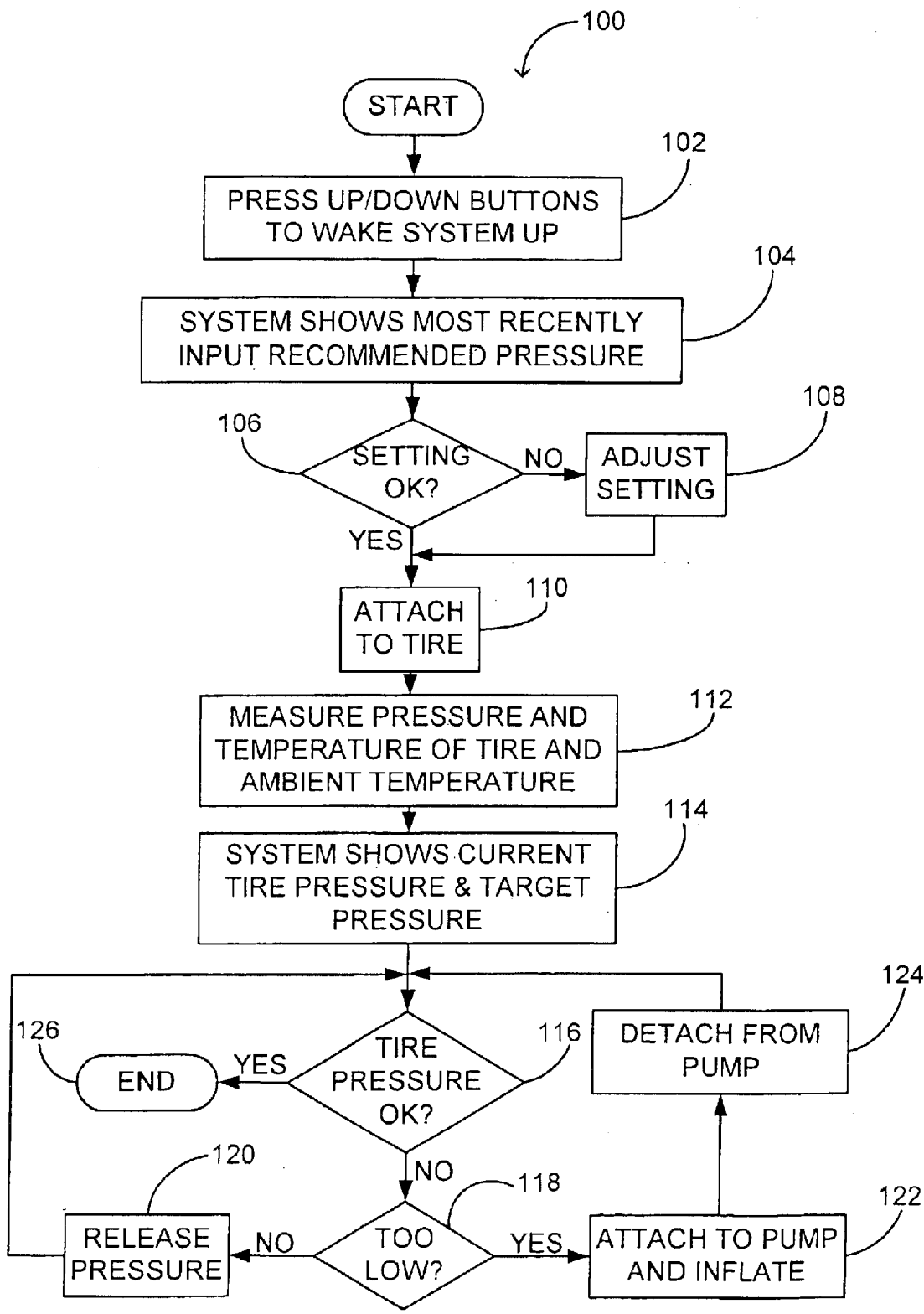
FIG. 5 is a flowchart illustrating a method according to one embodiment of the invention.

FIG. 5 is a flowchart illustrating a method 100 of adjusting the pressure in a tire according to one embodiment of the invention. A user initiates the method by pressing one of the user input buttons at block 102, which wakes up the system, which is preferably a device as described above with reference to FIGS. 2 to 4. The system then displays the most recently input recommended pressure at block 104. The user then compares the displayed recommended pressure with the manufacturer's recommended pressure at block 106. If the two are not in agreement, the user adjusts the displayed recommended pressure at block 108; otherwise, the user continues to block 110 and attaches the device to a tire. Once attached to a tire, the device measures the pressure and temperature of the air in the tire, as well as the ambient temperature, at block 112. The device then displays, at block 114, the tire's pressure and the target pressure, which is calculated as described above. The user then checks the tire's pressure against the target pressure at block 116. If these values do not match, the user determines if the tire's pressure is too low at block 118. If the tire's pressure is not too low, the user releases some pressure at block 120 and returns to block 116. If the tire's pressure is too low the user attaches a pump or other compressed air source to the valve and inflates the tire at block 122, detaches the pump at block 124 and returns to block 116. Once the user determines that the tire's pressure is equal to the target pressure at block 116, method 100 ends at block 126.

Figure 6:
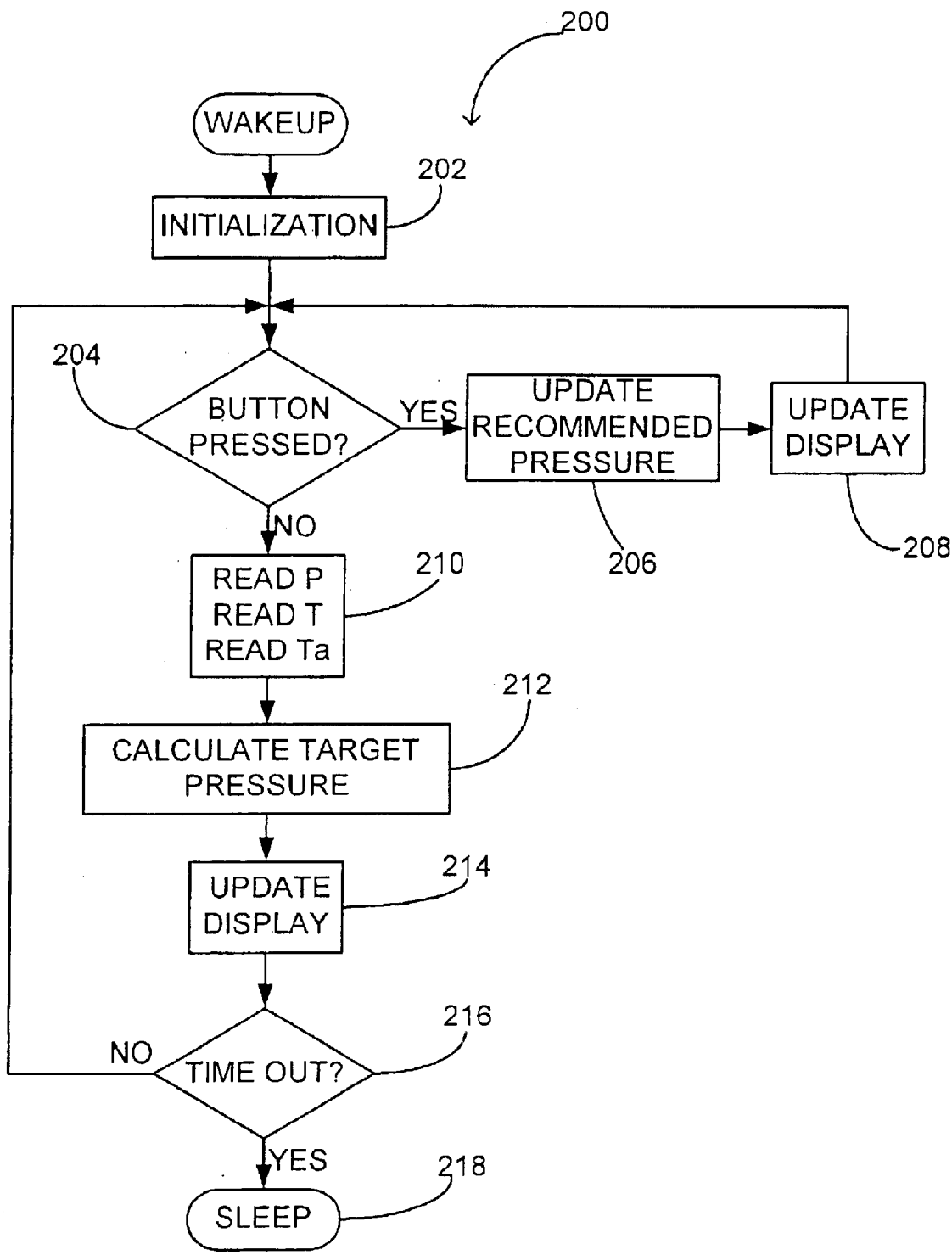
FIG. 6 is a flowchart illustrating the operation of the system in the method of FIG. 5.

FIG. 6 is a flowchart illustrating a method 200 carried out by a device being used by a user in the method of FIG. 5. Method 200 begins when the user presses one of the user input buttons, for example as in block 102 of FIG. 5, which wakes the device up. The device then undergoes initialization at block 202, wherein it displays the most recently input recommended pressure. The device then determines whether one of the user input buttons is still pressed at block 204. If a button is pressed, the device updates the recommended pressure at block 206 and the display at block 208, then returns to block 204. If no button is pressed and the device is connected to a tire, the device measures the pressure and temperature of the air in the tire, as well as the ambient temperature, at block 210. The device then calculates the target pressure at block 212, as described above, and updates the target pressure display at block 214. The device is preferably provided with a predetermined timeout period, so that if no buttons are pressed for the predetermined period, the device goes back to sleep. The device checks to see if the predetermined timeout period has elapsed at block 216, and if not, cycles back to block 204. If the predetermined timeout period has elapsed, the device goes back to sleep at block 218.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A device for measuring the pressure of a tire, the device comprising:
   (a) a microcontroller configured to calculate a target pressure;
   (b) a pressure sensor coupled to the microcontroller for measuring an internal pressure of the tire;
   (c) a first temperature sensor coupled to the microcontroller for measuring an internal temperature of the tire;
   (d) a user input coupled to the microcontroller for inputting a recommended pressure for the tire;
   (e) a second temperature sensor coupled to the microcontroller for measuring an ambient temperature; and,
   (f) a display coupled to the microcontroller for indicating:
      (i) the internal pressure of the tire; and,
      (ii) the target pressure,
   wherein the microcontroller converts the recommended pressure into the target pressure based on a ratio of the internal temperature in Kelvin to the ambient temperature in Kelvin, such that a user is able to inflate and deflate the tire until the display indicates that the internal pressure is equal to the target pressure.

2. A device according to claim 1 further comprising a valve configured to be coupled to a stem of the tire, the valve connected to be controlled by the microcontroller for regulating the inflation and deflation of the tire based on a difference between the internal pressure and the target pressure.

3. A device according to claim 2 further comprising a locking lever configured to releasably secure the valve onto the stem of the tire.

4. A device according to claim 1 wherein the display also indicates the recommended pressure input from the user input.

5. A method of inflating a tire comprising:
   (a) providing a device comprising a pressure sensor, first and second temperature sensors, a user input and a display, all coupled to a microprocessor;
   (b) coupling the device to the tire;
   (c) measuring an internal pressure P and an internal temperature T of air in the tire with the pressure sensor and the first temperature sensor, and measuring an ambient air temperature Ta with the second temperature sensor;
   (d) inputting a recommended pressure Pr with the user input;
   (e) calculating a target pressure Pt=Pr+P(1−Ta/T);
   (f) displaying the internal pressure P and the target pressure Pt on the display; and,
   (g) adjusting an amount of air in the tire so that the internal pressure P is equal to the target pressure Pt.

6. A method according to claim 5 wherein the device further comprises a valve coupled to the microcontroller, and wherein coupling the device to the tire comprises connecting a first end of the valve to a stem of the tire.

7. A method according to claim 6 wherein adjusting the amount of air in the tire comprises allowing air to flow from the first end of the valve to a second end of the valve when the internal pressure P is greater than the target pressure Pt.

8. A method according to claim 6 further comprising connecting the second end of the valve to a compressed air source and wherein adjust the amount of air in the tire comprises allowing air to flow from the second end of the valve to the first end of the valve when the internal pressure P is less than the target pressure Pt.

* * * * *